(12) United States Patent
Inouye (10) Patent No.: US 12,164,817 B2
(45) Date of Patent: Dec. 10, 2024

(54) AUTHENTICATION FOR MOBILE PRINT JOBS ON PUBLIC MULTI-FUNCTION DEVICES

(71) Applicant: Xerox Corporation, Norwalk, CT (US)

(72) Inventor: Steven H. Inouye, Cypress, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/168,092

(22) Filed: Feb. 13, 2023

(65) Prior Publication Data

US 2024/0272841 A1 Aug. 15, 2024

(51) Int. Cl.
*H04N 1/00* (2006.01)
*G06F 3/12* (2006.01)
*G06Q 30/0226* (2023.01)
*H04L 9/40* (2022.01)
*H04N 1/34* (2006.01)

(52) U.S. Cl.
CPC .......... *G06F 3/1222* (2013.01); *G06F 3/1238* (2013.01); *G06F 3/1292* (2013.01); *G06Q 30/0226* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 8,988,716 B1 | 3/2015 | Odean et al. | |
| 11,163,510 B1 * | 11/2021 | Zhang | G06F 3/1262 |
| 11,218,601 B2 | 1/2022 | Inouye et al. | |
| 2008/0034403 A1 * | 2/2008 | Kakigi | G06F 3/1288 726/1 |
| 2011/0085196 A1 * | 4/2011 | Liu | G06F 3/1204 358/1.15 |
| 2014/0226173 A1 | 8/2014 | Tredoux et al. | |
| 2016/0344878 A1 * | 11/2016 | Asthana | H04N 1/00212 |
| 2020/0079097 A1 | 3/2020 | Otsuka et al. | |
| 2020/0319832 A1 | 10/2020 | Zhao et al. | |
| 2021/0306473 A1 * | 9/2021 | Inouye | H04N 1/00307 |

OTHER PUBLICATIONS

Extended EP Search Report, Application No. 24153012.0, Jul. 4, 2024, 10 pages.

* cited by examiner

*Primary Examiner* — Andrew H Lam (57) ABSTRACT

Various methods are disclosed. For example, a method includes receiving, by a processor of a multi-function device at a location of an enterprise, a print job request from a mobile endpoint device, transmitting, by the processor, an authentication request to a print server, receiving, by the processor, an authentication confirmation from the print server that a user of the mobile endpoint device is associated with an enterprise where the MFD is located, and executing, by the processor, the print job.

9 Claims, 8 Drawing Sheets

AUTHENTICATION FOR MOBILE PRINT JOBS ON PUBLIC MULTI-FUNCTION DEVICES

The present disclosure relates generally to public multi-function devices (MFDs) and relates more particularly to authentication for mobile print jobs on public MFDs.

BACKGROUND

Multi-function devices (MFDs) are electronic devices that can perform a variety of different functions. For example, MFDs can print, scan, copy, fax, email scanned documents, transmit scanned documents to a network storage account, and the like.

Some MFDs may be located in public settings. Some establishments may want to offer free printing for customers. For example, hotels may offer free printing to hotel guests and may have public MFDs that can be used by hotel guests.

SUMMARY

According to aspects illustrated herein, there are provided various methods for authenticating mobile print jobs on a public MFD. One disclosed feature of the embodiments is a method comprising receiving, by a processor of a multi-function device at a location of an enterprise, a print job request from a mobile endpoint device, transmitting, by the processor, an authentication request to a print server, receiving, by the processor, an authentication confirmation from the print server that a user of the mobile endpoint device is associated with an enterprise where the MFD is located, and executing, by the processor, the print job.

Another disclosed feature is a method comprising receiving, by a processor of a print server, a request from a mobile endpoint device for a webpage associated with a universal resource locator (URL) found in a machine readable code displayed by a multi-function device (MFD) at a location of an enterprise, wherein the webpage provides print job options on the MFD to the mobile endpoint device, confirming, by the processor, that a user of the mobile endpoint device is associated with the enterprise, receiving, by the processor, a print job request from the MFD, transmitting, by the processor, to the MFD an authentication confirmation to execute the print job request on the MFD.

Another disclosed feature is a method comprising receiving, by a processor of a router on a private network at a location of an enterprise, log in credentials from a mobile endpoint device to join the private network, authenticating, by the processor, the mobile endpoint device to join the private network at the location of the enterprise, and accessing, by the processor, a private universal resource locator (URL) address hosted by a print server, wherein the private URL address is obtained from a machine readable code scanned by the mobile endpoint device from a display of a multi-function device (MFD) at the location of the enterprise, wherein the private URL address provides a webpage to request a print job that is allowed by the enterprise to be executed on the MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a system and method for authentication of mobile print jobs on public MFDs. As discussed above, some MFDs may be located in public settings. Some establishments may want to offer free printing for customers. For example, hotels may offer free printing to hotel guests and may have public MFDs that can be used by hotel guests.

Some public MFDs may deploy kiosks that require payment to execute print jobs. However, some establishments (e.g., hotels) may still want to offer free printing to hotel guests. As a result, deploying kiosks may be undesirable. In addition, hotels may not want to spend capital on the cost of deploying a kiosk printer or MFD in the hotel.

Thus, some establishments may want to keep the cheaper public or non-kiosk MFDs at their location. As a result, some establishments may want a way to prevent outside users from executing print jobs on the public MFDs located at their establishment.

The present disclosure provides a method of authentication that ensures customers of the establishment are authorized to execute free print jobs on and prevents outsiders from using a public MFD. The authentication method of the present disclosure may also be modified to verify loyalty member status of a customer and to offer different tiered print jobs/print options based on the verified loyalty member status of the customer.

The authentication method of the present disclosure may be deployed with minimal changes to hardware and/or software by the establishment. For example, the authentication method of the present disclosure may be deployed with existing public MFDs with minimal configuration changes.

Figure 1:
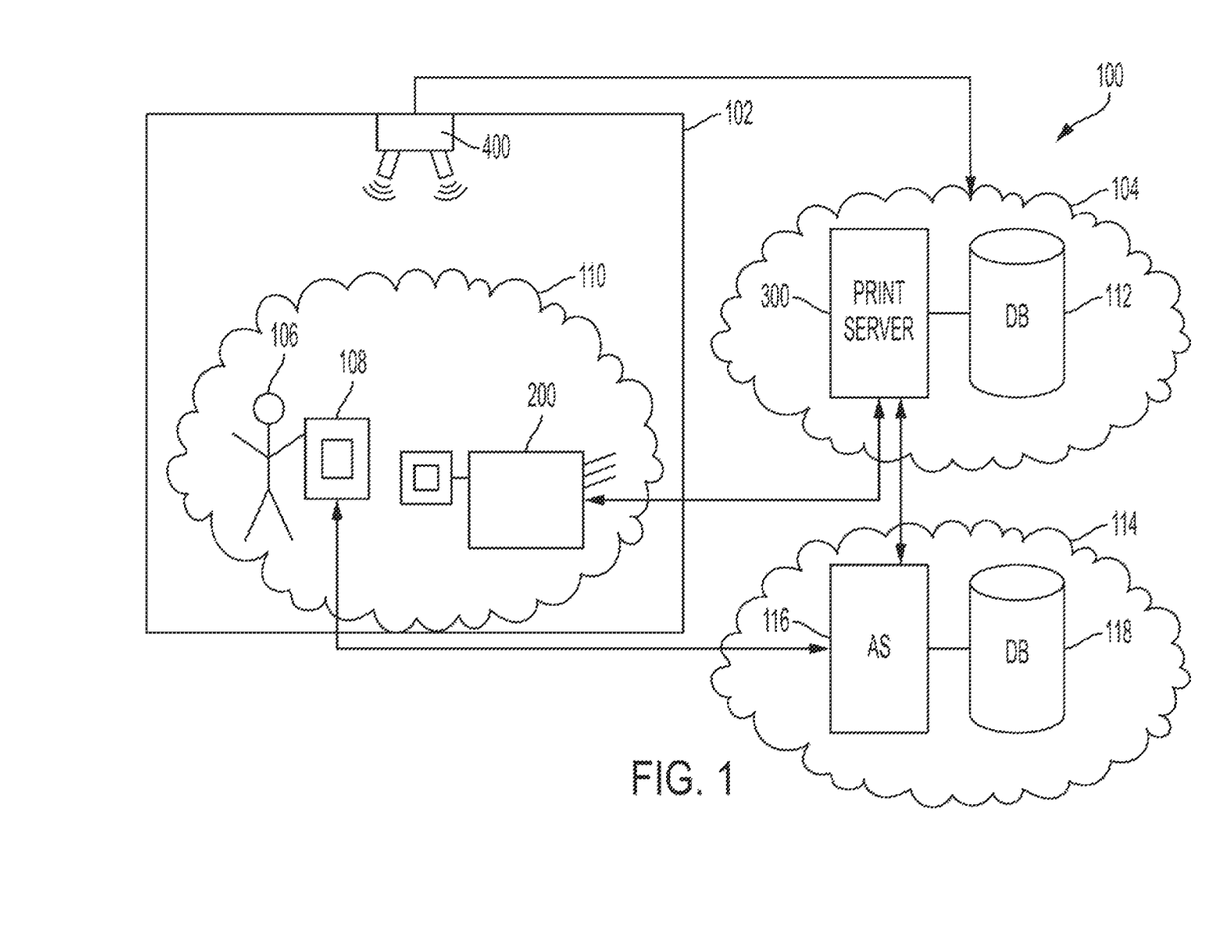
FIG. 1 illustrates an example network of the present disclosure.

FIG. 1 illustrates an example network 100 of the present disclosure. The network 100 may include a location 102, a print server network 104, and a loyalty program network 114. The location 102 may be a building of an enterprise or company that is deploying the authentication method of the present disclosure for print jobs on public MFDs. For example, the location 102 may be hotel building that includes an MFD 200.

In one embodiment, the location 102 may include a network router 400 that provides a WiFi signal for a private network 110 within the location 102. A block diagram of the network router 400 is illustrated in FIG. 4.

Figure 4:
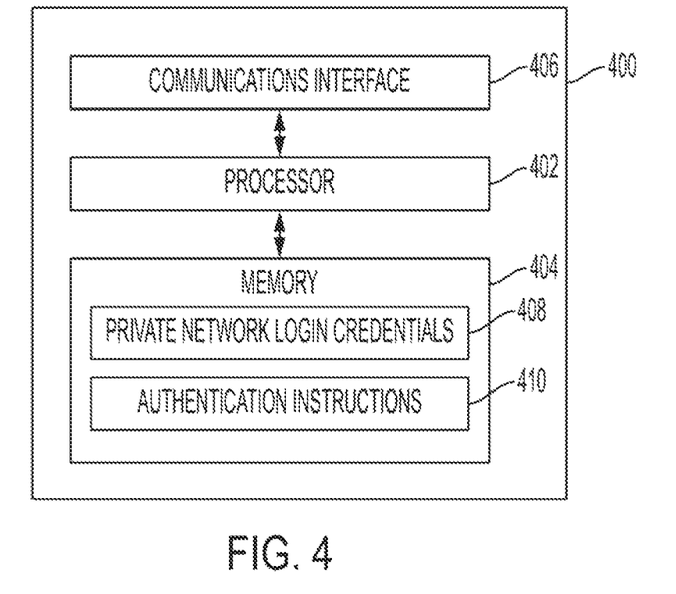
FIG. 4 illustrates an example of a network router of the present disclosure.

Referring to FIG. 4, the network router 400 may include a processor 402, a memory 404, and a communications interface 406. The processor 402 may be communicatively coupled to the memory 404 and the communications interface 406. The processor 402 may control operation of the communications interface 406 and may execute instructions stored in the memory 404.

In one embodiment, the memory 404 may be any type of non-transitory computer readable medium. For example, the memory 404 may be a hard disk drive, a solid state drive, random access memory (RAM), read only memory (ROM), non-volatile memory express (NVMe) memory, and the like.

In one embodiment, the memory 404 may include private network log-in credentials 408 and authentication instructions 410. The private network log-in credentials 408 may include credentials issued to users 106 that are guests or customers of the location 102. The log-in credentials 408 can be periodically updated as new credentials are issued and as old credentials expire.

Figure 8:
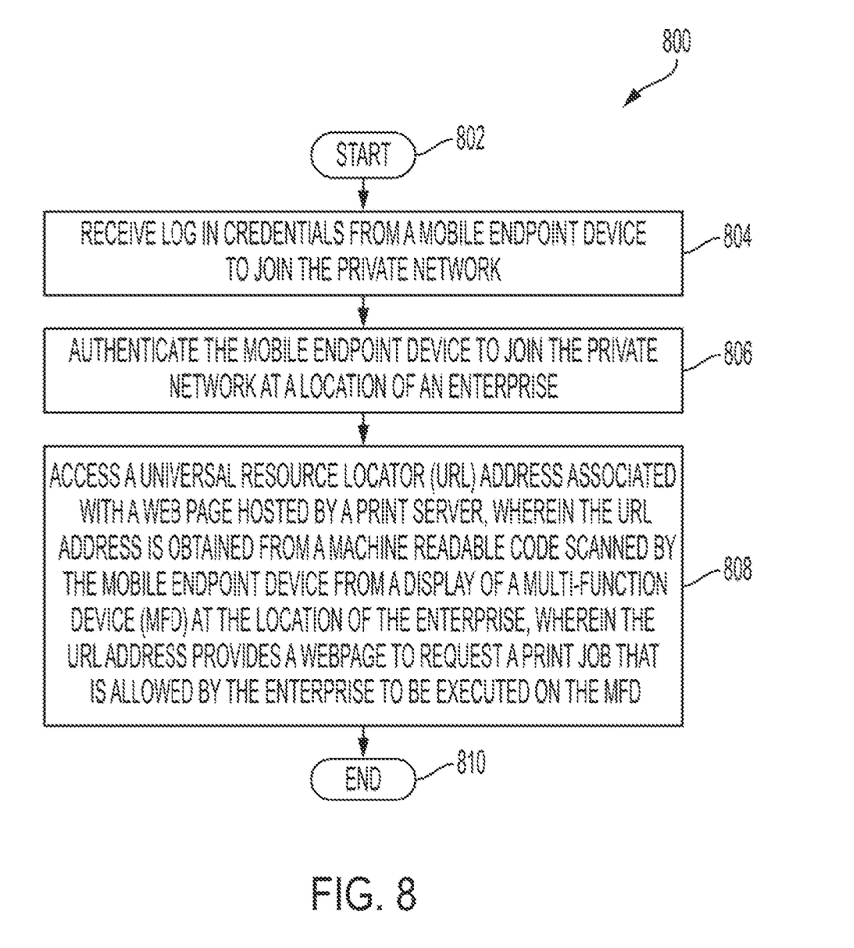
FIG. 8 illustrates a flow chart for a method of authenticating a mobile print job on a public MFD of the present disclosure from the perspective of the network router.

In one embodiment, the authentication instructions 410 may include instructions that are executed by the network router 400 to perform a method of authenticating mobile print jobs on a public MFD (e.g., an MFD 200). An example of a method of authenticating mobile print jobs on a public MFD (e.g., an MFD 200 is illustrated in FIG. 8, and discussed in further detail below.

In one embodiment, the communications interface 406 may be a wireless communications interface. For example, the communications interface 406 may include a wireless radio that emits and receives wireless data signals transmitted within the private network 110. The network router 400 may receive and transmit data signals received from external networks (e.g., the print server network 104 and/or the third party loyalty program network 114). The data signals may be conveyed by the network router 400 via the communications interface 406 to and from devices on the private network 110 (e.g., a mobile endpoint device 108 and/or an MFD 200).

It should be noted that the network router 400 has been simplified for ease of explanation and may include additional components that are not shown. For example, the network router 400 may include a power supply, additional satellite routers to extend the WiFi signal throughout the location 102, additional external devices and/or communication interfaces, and the like.

Referring back to FIG. 1, the private network 110 may be private such that only employees or guests/customers of the location 102 may access the private network 110 with credentials issued by the location 102. For example, a location 102 may be a hotel. A user 106 of the mobile endpoint device 108 may be a guest of the hotel. The user 106 may be issued credentials (e.g., a password or last name and room number) to access the private network 110. The user 106 may enter the credentials from a log-in webpage shown on a display of the mobile endpoint device 108 to access the private network 110.

Figure 2:
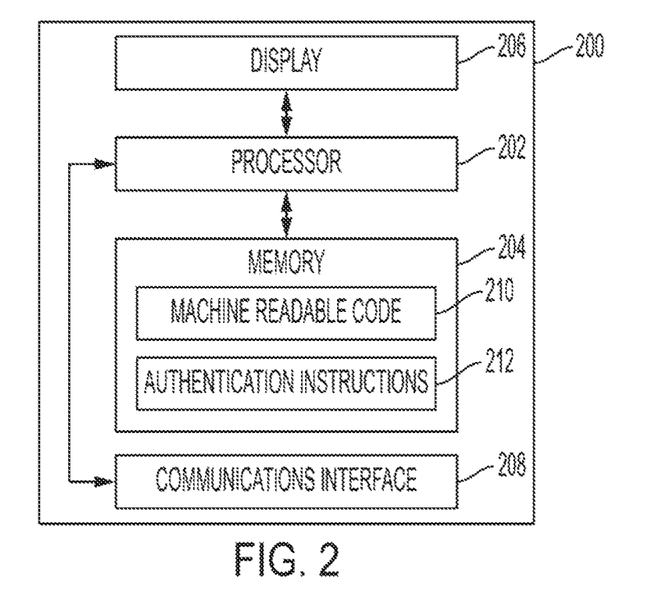
FIG. 2 illustrates a block diagram of an example MFD of the present disclosure.

In one embodiment, the mobile endpoint device 108 may be any type of mobile endpoint device, such as a laptop computer, a tablet computer, a mobile telephone, a smart phone, and the like. The mobile endpoint device 108 may be used to transmit mobile print jobs (broadly interpreted to include printing, scanning, copying, and the like) to the MFD 200. The MFD 200 may be a device that is capable of performing print functions, copy functions, scan functions, fax functions, and the like. The MFD 200 may be deployed at the location 102 and connected to the private network 110. FIG. 2 illustrates a block diagram of an example MFD 200 of the present disclosure.

In one embodiment, the MFD 200 may include a processor 202, a memory 204, a display 206, and a communications interface 208. The processor 202 may be communicatively coupled to the memory 204, the display 206, and the communications interface 208. The processor 202 may control operation of the display 206 and the communications interface 208 and may execute instructions stored in the memory 204.

In one embodiment, the memory 204 may be any type of non-transitory computer readable medium. For example, the memory 204 may be a hard disk drive, a solid state drive, random access memory (RAM), read only memory (ROM), non-volatile memory express (NVMe) memory, and the like.

In one embodiment, the memory 204 may include a machine readable code 210. The machine readable code 210 may be any type of graphical code or image that may contain information to initiate an authentication process or a method for a mobile print job. For example, the machine readable code 210 may be a quick response (QR) code or a bar code that can be captured and translated by the mobile endpoint device. For example, the mobile endpoint device 108 may include a camera that can capture a picture or video of the machine readable code 210 and then read the information encoded by the machine readable code 210.

In one embodiment, the machine readable code 210 may be periodically updated by the MFD 200. For example, the machine readable code 210 may include a rolling security code that allows access to the MFD 200. The rolling security code may prevent copy and reuse of the machine readable code 210 by others who may not be authorized to access the MFD 200. The rolling security code may allow the mobile endpoint device 108 to establish a wireless connection (e.g., over the private network 110) to the MFD 200 to transmit a print job request.

In one embodiment, the machine readable code 210 may also include a universal resource locator (URL) address of the print server 300. The URL address may also include an identifier for the MFD 200 (e.g., MFD name, unique numerical ID of the MFD, and the like) and the rolling security code, described above.

The URL address loads a webpage onto the mobile endpoint device 108. The webpage may verify that the security code is correct. In addition, based on the MFD identifier, the webpage may check to see if the mobile endpoint device 108 can access the private network 110. If the mobile endpoint device 100 is on the private network 110, a session is created, and a session token is used as a security mechanism for the remainder of the session.

If the mobile endpoint device 108 is not on the private network 110, then the user is prompted to join the private network 110, as described above, and to scan the machine readable code 210 again. If, based on the MFD identifier, the mobile endpoint device 108 should authenticate with a server on a public network (rather than be a member of the private network 110), then a public server login page is displayed on the mobile endpoint device 108. If the authentication is successful, a session is created, and a session token is used as a security mechanism for the remainder of the session.

Figure 6:
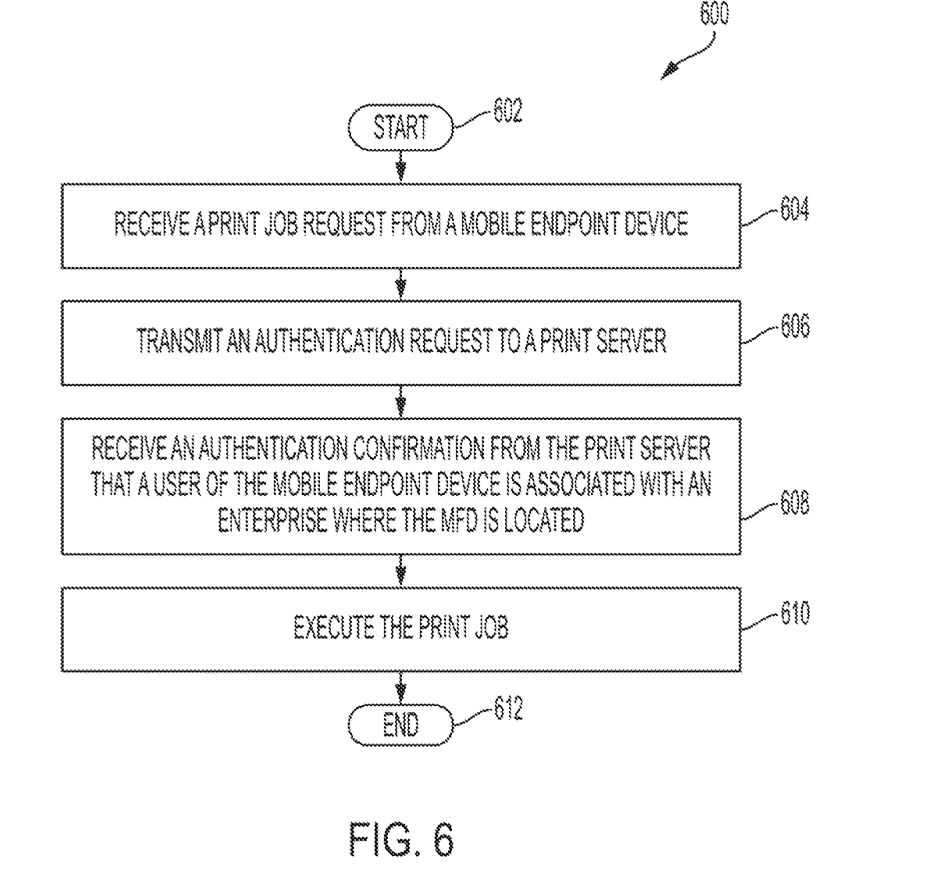
FIG. 6 illustrates a flow chart for a method of authenticating a mobile print job on a public MFD of the present disclosure from the perspective of the MFD.

In one embodiment, the authentication instructions 212 may include instructions that are executed by the MFD 200 to perform a method of authenticating mobile print jobs on the public MFD 200. An example of a method of authenticating mobile print jobs on the public MFD 200 is illustrated in FIG. 6 and discussed in further detail below.

The display 206 may be a touch screen display that displays a graphical user interface (GUI). In one embodiment, the display may be a non-touch screen display. An input device (e.g., a keyboard, mouse, track pad, and the like) may be used to interact with the GUI if the display is a non-touch screen display.

The display 206 may also show the machine readable code 210. As noted above, the mobile endpoint device 108 may then capture an image of the machine readable code 210 from the display 206.

In one embodiment, the communications interface 208 may include a wired or wireless communications interface. For example, the communications interface 208 may include a wireless radio to connect to the private network 110 or an Ethernet connection directly to the network router 400 to connect to the private network 110.

It should be noted that the MFD 200 has been simplified for ease of explanation and may include additional components that are not shown. For example, the MFD 200 may include a various paper trays, printing fluid dispensed from a toner cartridge or an inkjet cartridge, various finishing modules (e.g., a stapler, a collator, and the like), an optical scanner, and the like.

Referring back to FIG. 1, the MFD 200 may be provided at the location 102 to allow guests (e.g., the user 106) to access free printing. Rather than deploying a print kiosk to require users to pay for print jobs, the present disclosure may make modifications to the MFD 200 and/or to the private network 110 to allow an authentication method for mobile print jobs to be deployed on existing devices at the location 102. Further details regarding how the authentication is performed are discussed below.

In one embodiment, the print server network 104 and the loyalty program network 114 may be internet protocol (IP) networks. The print server network 104 may include a print server 300 and a database (DB) 112. The database 112 may be a separate network storage device, or the print server 300 and the database 112 may be deployed as a single device.

In one embodiment, the DB 112 may store various information associated with available printers managed by the print server 300. For example, the DB 112 may include a list of printers, printer address information, printer capability information, authorized users for different printers, costs for print jobs for each printer, and the like.

In one embodiment, the print server 300 may be deployed as computing device or server. A block diagram of an example print server 300 is illustrated in FIG. 3.

Figure 3:
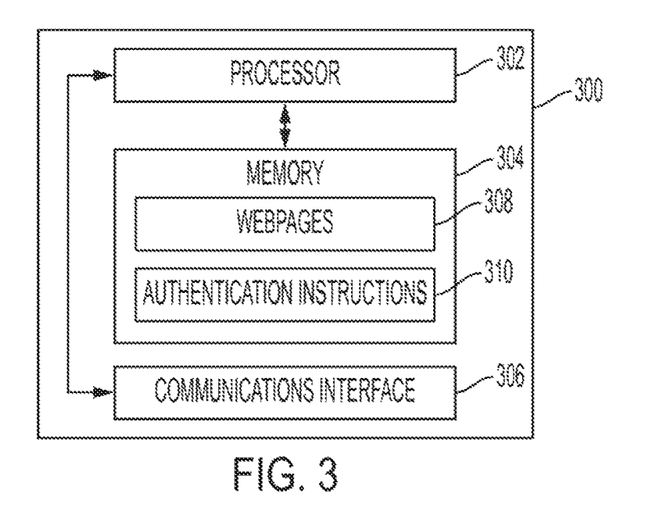
FIG. 3 illustrates an example of a print server of the present disclosure.

Referring to FIG. 3, the print server 300 may include a processor 302, a memory 304, and a communications interface 306. The processor 302 may be communicatively coupled to the memory 304 and the communications interface 306. The processor 302 may control operation of the communications interface 306 and may execute instructions stored in the memory 304.

In one embodiment, the memory 304 may be any type of non-transitory computer readable medium. For example, the memory 304 may be a hard disk drive, a solid state drive, random access memory (RAM), read only memory (ROM), non-volatile memory express (NVMe) memory, and the like.

In one embodiment, the memory 304 may include web pages 308 and authentication instructions 310. The web pages may be accessed via the private URL contained in the machine readable code 210 generated by the MFD 200.

In one embodiment, the web pages 308 may include a series of web pages that navigate a user through the print job request process on the mobile endpoint device 108 of the user. For example, the web pages 308 may include a web page to select a type of job available on the MFD 200 for guests of the location 102, a web page for selecting various print job options (e.g., color, number of copies, two-sided printing, stapling, paper size, and the like), a web page for payment confirmation (if there is a charge), and the like.

In one embodiment, different web pages 308 may be presented depending on whether the user 106 is authorized as a guest or customer of the location 102, as discussed in further detail below. For example, a web page 308 that includes free print options may be presented to the user 106 if the user 106 is verified as a guest or a customer. A different web page 308 may be presented to the user 106 that includes costs for each print job if the user 106 is not verified as a guest or a customer.

In one embodiment, the different web pages 308 may be presented to the user 106 based on a loyalty program status of the location 102. In other words, different loyalty member tiers may be associated with different allowable or free print jobs. Said another way, different pricing tiers may be associated with different loyalty member tiers.

For example, after the user 106 is authorized as a guest or customer of the location 102, the user 106 may log into a loyalty program network 114. The print server 300 may receive the loyalty program status information (e.g., the tier or level reached by the user for the loyalty program) of the user 106 and may present an appropriate web page 308 to the user 106. For example, the highest loyalty program status may be allowed to print any type of print job for free and/or to have an unlimited amount of free print jobs. A lowest loyalty program status may be allowed to only print black and white for free and/or to have a limited number of free print jobs. Examples of various screen shots of different web pages 308 are illustrated, and an example process flow is shown, in FIG. 5.

Figure 7:
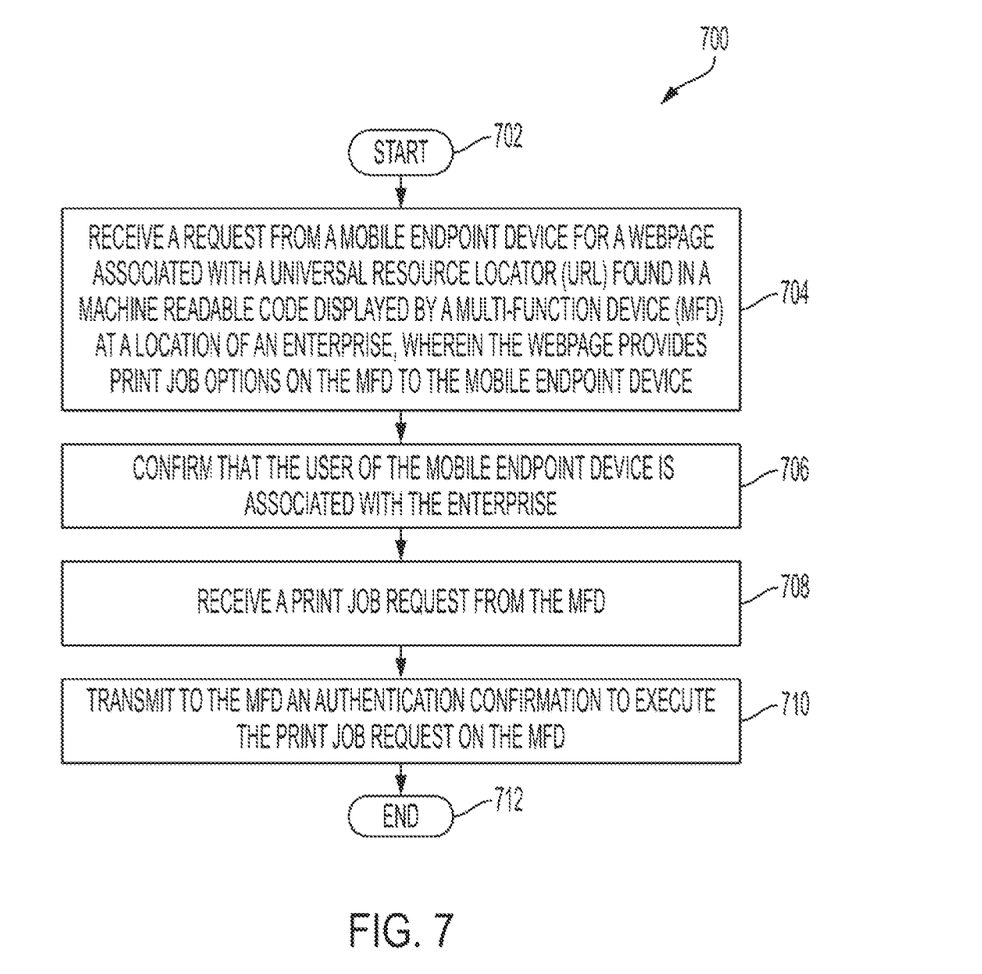
FIG. 7 illustrates a flow chart for a method of authenticating a mobile print job on a public MFD of the present disclosure from the perspective of the print server.

In one embodiment, the authentication instructions 310 may include instructions that are executed by the print server 300 to perform a method of authenticating mobile print jobs on a public MFD (e.g., an MFD 200). An example method of authenticating mobile print jobs on a public MFD (e.g., an MFD 200) is illustrated in FIG. 7, and discussed in further detail below.

In one embodiment, the communications interface 306 may be a wired or wireless communications interface. For example, the communications interface 306 may include a wireless radio or an Ethernet connection.

It should be noted that the print server 300 has been simplified for ease of explanation and may include additional components that are not shown. For example, the print server 300 may include a power supply, external device and/or communication interfaces, and the like.

Referring back to FIG. 1, the loyalty program network 114 may include an application server (AS) 116 and a database (DB) 118. The AS 116 may be deployed as a computing device with a processor and memory. The DB 118 may store various information associated with different users and associated loyalty program status.

It should be noted that the network 100 has been simplified for ease of explanation and may include other devices and components that are not shown. For example, the network 100 may include gateways, switches, routers, firewalls, access points, access networks, and the like.

As noted above, the network 100 may provide a location 102 with the ability to use the private network 110 to authorize mobile print jobs on a public MFD 200 located at the location 102. For example, the user 106 may want to execute a print job on the MFD 200. The location 102 may be a hotel, and the user 106 may be a guest of the hotel. The user 106 may have log-in credentials issued by the location 102 to access the private network 110.

The user 106 may select a WiFi name of the private network 110 that is publicly broadcasted on the mobile endpoint device 108. The mobile endpoint device 108 may display a web page to enter the credentials to access the private network 110 in response to the user 106 selecting the WiFi name of the private network 110 on the mobile endpoint device 108.

After the user 106 connects the mobile endpoint device 108 to the private network 110, the user 106 may scan a machine readable code (e.g., the machine readable code 210) displayed by the MFD 200. The machine readable code 210 may contain a URL that loads a web page from the print server 300 on the mobile endpoint device 108. The web page may verify that the security code obtained from the scanned machine readable code is correct. In addition, the webpage may check to see if the mobile endpoint device 108 can access the private network 110. If the mobile endpoint device 108 successfully accessed the private network 110, as described above, a session may be created with the print server 300, and a session token may be issued to the mobile endpoint device 108. The session token may be used as a security mechanism for the remainder of the session.

While connected to the private network 110, the mobile endpoint device 108 may access the URL hosted by the print server 300. The print server 300 may confirm that the user 106 is a guest of the location 102 by detecting that the mobile endpoint device 108 is on the private network 110. The print server 300 may confirm that the mobile endpoint device 108 is on the private network 110 by confirming that an internet protocol (IP) address contained in the request from the mobile endpoint device 108 belongs to a particular subnet of the private network 110 or via the issued session token from the web page hosted by the print server 300 for the duration of the session.

The print server 300 may return a web page to indicate which print jobs may be free for the user 106 on the mobile endpoint device. The user 106 may select a print job, and the print job may be sent to the MFD 200 using the mobile endpoint device 108.

In response, the MFD 200 may transmit a request to the print server 300 for authorization. The print server 300 may verify that the print job that was selected via the web page on mobile endpoint device 108 is the same as the print job request from the MFD 200 and may confirm that user 106 is an authorized guest of the location 102. In response, the print server may send an authorization confirmation or signal back to the MFD 200. The MFD 200 may then execute the print job.

In one embodiment, the location 102 may provide different free print jobs depending on a loyalty member status of the user 106. For example, after the user connects the mobile endpoint device 108 to the private network 110 and scans the machine readable code 210, the print server 300 may present a web page that redirects the mobile endpoint device 108 to the AS 116 to log into the loyalty program network 114. The user 106 may log into his or her loyalty program account. The AS 116 may then transmit the loyalty program status of the user 106 to the print server 300 directly or via the mobile endpoint device 108.

The print server 300 may then present print options based on the loyalty member status of the user 106. For example, a lowest loyalty member status may only offer free black and white printing and limit the number of print jobs to 10 per stay. Thus, the print server 300 may present a web page on the mobile endpoint device 108 that indicates that free black and white printing and a counter with a number of free print jobs remaining or that indicates that scan to email jobs are free. The other print options may include costs associated with them. For example, color printing may be 20 cents per page or color copying may be 20 cents per page. In one embodiment, some of the unavailable options (e.g., print jobs that are not free) may be grayed out such that the user 106 cannot select those options.

On the other hand, a highest loyalty member status may offer unlimited free print jobs for any type of print job. Thus, the print server 300 may present a web page that shows all available print jobs that the MFD 200 is capable of performing with no costs. Based on the loyalty program status of the user 106, the user 106 may select the desired print job on the mobile endpoint device 108, and the print job may be authorized by the print server 300, as described above.

Thus, according to embodiments of the present disclosure, the enterprise at the location 102 may provide security to prevent any user from executing print jobs on the MFD 200. In addition, the enterprise may use the existing MFD 200 and private network 110 to execute the authorization method of the present disclosure.

Figure 5:
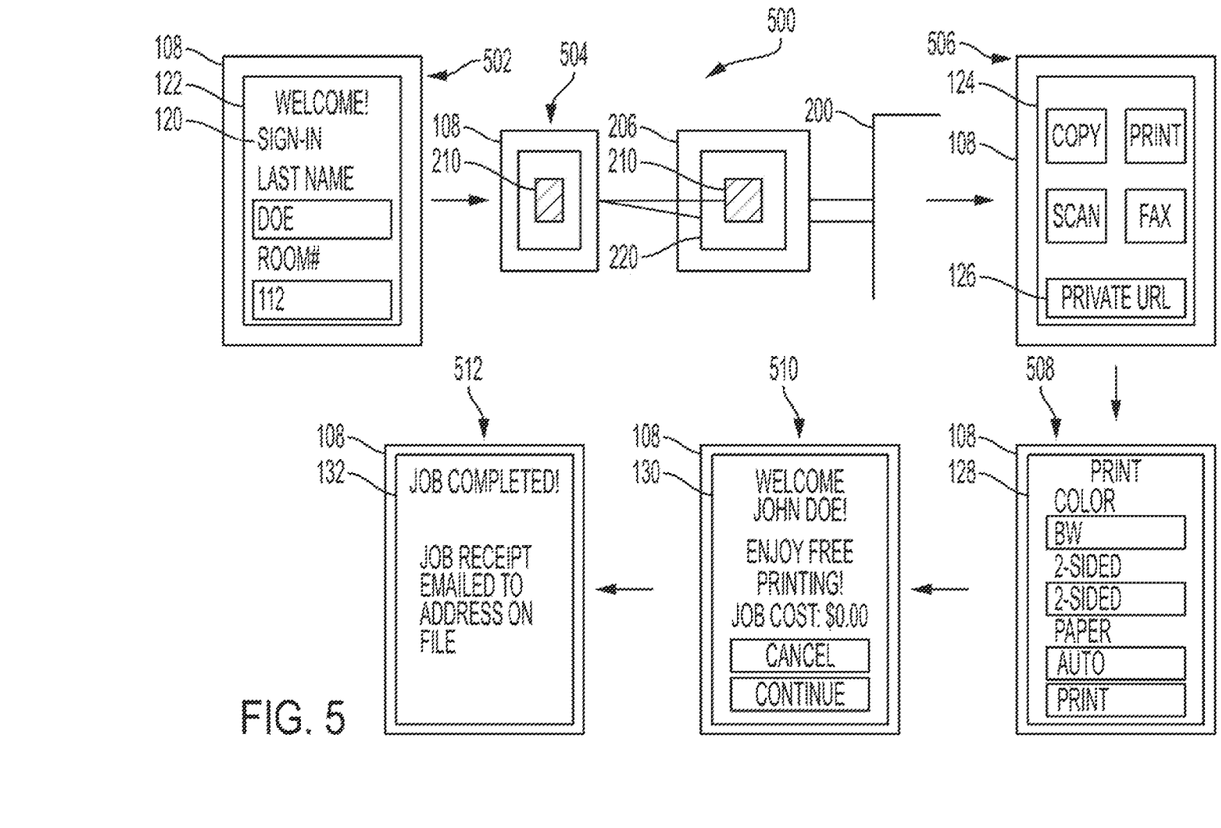
FIG. 5 illustrates example sequence of screen shots on a mobile device of the present disclosure.

FIG. 5 illustrates an example sequence 500 of screen shots on the mobile endpoint device 108 of the present disclosure. The screen shots may illustrate an example sequence of the authorization of the mobile print job that was described above.

The sequence 500 may begin at step 502. At step 502, the user 106 may select the name of the private network 110 via the mobile endpoint device 108. A display 120 of the mobile endpoint device 108 may present a log-in webpage 122 to access the private network 110. The user 106 may enter the issued credentials in the webpage 122.

At step 504, after the mobile endpoint device 108 is connected to the private network 110, the user 106 may capture a machine readable code 210. The machine readable code 210 may be bar code, a QR code, or any other type of image that contains information that can be scanned or read by the mobile endpoint device 108. The machine readable code may include a security code and an MFD identifier.

In one embodiment, the machine readable code 210 may be shown in a GUI 220 shown on a display 206 of the MFD 200. The machine readable code 210 may be captured via a camera, or any other type of video or image recording component, of the mobile endpoint device 108.

At step 506, the mobile endpoint device 108 may extract a URL address 126 from the machine readable code 210 that may initiate an authorization process for mobile print job requests on the MFD 200. In one embodiment, the URL address may point to a web page hosted by the print server 300.

The web page may verify that the security code is correct. In addition, based on the MFD identifier, the webpage may check to see if the mobile endpoint device 108 can access the private network 110. If the mobile endpoint device 108 is on the private network 110, a session is created, and a session token is used as a security mechanism for the remainder of the session. The mobile endpoint device 108 may select a print job available on the MFD 200 via the web page 124.

As noted above, the web page 124 may include print job options that are available to the user. In some embodiment, the web page 124 may indicate which print jobs are free and display a cost associated with other types of print jobs. In one embodiment, the web page 124 may display a counter if the number of free print jobs is limited. In one embodiment, the web page 124 may gray out certain icons for print jobs that are not available. As noted above, in some embodiments, a loyalty member status of the user 106 may determine which print jobs are available to be selected. After the user 106 selects a print job, the sequence 500 may proceed to step 508.

At step 508, another web page 128 may be presented to allow a user 106 to select various options for the print job. For example, the user 106 may be allowed to select color or black and white printing, one-sided or two-sided printing, a paper size, and the like. Some options may not be available. For example, if the user 106 is only allowed to have free black and white printing, some of the fields for the options may be automatically populated and fixed so that the user 106 cannot change the selection.

At step 510, another web page 130 may be shown on the mobile endpoint device 108 indicating that the selected print job is free. The user 106 may choose the continue icon to continue with the print job.

When the print job is submitted, the print job request may be transmitted to the MFD 200. As discussed above, the MFD 200 may then transmit an authorization request to the print server 300. The print server 300 may confirm that the print job request is from the user 106 who is logged into the private network 110 (e.g., via the presence of the session token) and/or may confirm the loyalty program status of the user 106, as described above. The print server 300 may then send an authorization back to the MFD 200 to execute the print job.

At step 512, the print job may be executed and a web page 132 may be displayed on the mobile endpoint device 108 indicating the print job was successfully completed. In one embodiment, a record of the print job may be transmitted via email to the user 106. The email may be obtained from the guest account information held by the location 102 (e.g., email on file for the guest when the hotel room was booked).

FIG. 6 illustrates a flow chart of an example method 600 for authenticating a mobile print job on a public MFD of the present disclosure from the perspective of the MFD. In one embodiment, the method 600 may be performed by the MFD 200 described above or by an apparatus such as the apparatus 900 illustrated in FIG. 9 and discussed below.

In one embodiment, the method 600 begins at block 602. At block 604, the method 600 receives a print job request from a mobile endpoint device. For example, the MFD may display a machine readable code on a display. The mobile endpoint device may scan the machine readable code generated by the MFD to initiate a mobile print job authentication process. The machine readable code may contain a URL of a webpage hosted by a print server.

The webpage may be used to authenticate the mobile endpoint device and to confirm that the mobile endpoint device is on the private network of the location, as described above. The URL may provide a sequence of web pages for a user to select and submit a print job request to the MFD after the mobile endpoint device is confirmed to be on the private network of a location where the MFD is located.

At block 606, the method 600 transmits an authentication request to a print server. The print server may verify that the print job request is from a mobile endpoint device that is on a private network of an enterprise location. For example, the print job request may include an IP address and/or subnet of the mobile endpoint device that sent the print job request. The print server may verify that the IP address and/or subnet matches the IP address and/or subnet of the private network associated with the enterprise location. In another embodiment, the verification may be performed by the presence of a session token that was issued to the mobile endpoint device when the endpoint device was authenticated by the web page accessed from the URL in the machine readable code.

In one embodiment, the print server may also determine the loyalty member status of the user or guest, as described above. The print server may determine if the print job request is authorized for the loyalty member status associated with the user. If the print job request is authorized, the print server may generate an authentication confirmation message and may transmit the authentication confirmation back to the MFD.

At block 608, the method 600 receives an authentication confirmation from the print server that a user of the mobile endpoint device is associated with an enterprise where the MFD is located.

At block 610, the method 600 executes the print job. In one embodiment, the MFD may transmit a successful completion of the print job back to the print server. The print server may then keep a count of a number of free print jobs available for the user (if applicable). At block 612, the method 600 ends.

FIG. 7 illustrates a flow chart of an example method 700 for authenticating a mobile print job on a public MFD of the present disclosure from the perspective of the print server. In one embodiment, the method 700 may be performed by the print server 300 described above or by an apparatus such as the apparatus 900 illustrated in FIG. 9 and discussed below.

In one embodiment, the method 700 begins at block 702. At block 704, the method 700 receives a request from a mobile endpoint device for a webpage associated with a universal resource locator (URL) found in a machine readable code displayed by a multi-function device (MFD) at a location of an enterprise, wherein the webpage provides print job options on the MFD to the mobile endpoint device.

At block 706, the method 700 confirms that a user of the mobile endpoint device is associated with the enterprise. For example, the request from the mobile endpoint device may include an IP address and/or a subnet. The print server may confirm that the IP address and/or subnet matches the IP address and/or subnet of the private network provided by the enterprise at the location where the MFD is located.

In another example, the web page may verify the security code obtained by the mobile endpoint device from the machine readable code. In addition, based on the MFD identifier, the webpage may check to see if the mobile endpoint device can access the private network. If the mobile endpoint device is confirmed to be on the private network, a session is created, and a session token is issued to the mobile end point device. The session token indicates that the mobile endpoint device is associated with the enterprise.

In one embodiment, the association may be confirmed by a loyalty member status of the user. For example, the user may be requested to log into a loyalty member network to access the user's loyalty member account information. The loyalty member status of the user may then be transmitted to the print server for confirmation that the user of the mobile endpoint device is associated with the enterprise. In one embodiment, confirmation that the mobile endpoint device is on the private network and that the loyalty member status of the user may both be performed.

After the user is confirmed to be associated with the enterprise, the print server may provide a series of web pages to the mobile endpoint device of the user to allow the user to select a print job. The available print options may depend on whether the user was confirmed and/or on a loyalty program status of the user. The user may select an available print job option from the web pages, and the print job request may be submitted to the MFD for execution.

At block 708, the method 700 receives a print job request from the MFD. The MFD may transmit an authorization request to the print server in response to receiving the print job request for execution from the mobile endpoint device.

At block 710, the method 700 transmits, to the MFD, an authentication confirmation to execute the print job request on the MFD. For example, the print server may verify that the print job request is available for the user based on confirmation that the mobile endpoint device is on the private network of the enterprise and/or on confirmation of the loyalty program status of the user, as described above. The authentication may allow the MFD to complete the print job. At block 712, the method 700 ends.

FIG. 8 illustrates a flow chart of an example method 800 for authenticating a mobile print job on a public MFD of the present disclosure from the perspective of a network router. In one embodiment, the method 800 may be performed by the network router 400 described above or by an apparatus such as the apparatus 900 illustrated in FIG. 9 and discussed below.

In one embodiment, the method 800 begins at block 802. At block 804, the method 800 receives log-in credentials from a mobile endpoint device to join the private network. For example, a mobile endpoint device may select the name associated with the private network to attempt to join the private network. In response, a web page may be presented to the mobile endpoint device to allow the user to enter the log-in credentials that were issued by an enterprise of the private network. For example, for a hotel guest, the credentials may be a last name and a room number; for a retail store, the credentials may be a password issued to customers, and the like.

At block 806, the method 800 authenticates the mobile endpoint device to join the private network at the location of the enterprise. The mobile endpoint device may be connected to the private network.

At block 808, the method 800 accesses a universal resource locator (URL) address associated with a web page hosted by a print server, wherein the URL address is obtained from a machine readable code scanned by the mobile endpoint device from a display of a multi-function device (MFD) at the location of the enterprise, wherein the URL address provides a webpage to request a print job that is allowed by the enterprise to be executed on the MFD.

For example, a user may want to execute a print job on an MFD located at the enterprise. The MFD may display a machine readable code that can be captured by the mobile endpoint device of the user. The machine readable code may include a URL address that can be accessed by the mobile endpoint device while on the private network of the enterprise.

The URL address may include a webpage that can verify a security code obtained by the mobile endpoint device from the machine readable code of the MFD. The webpage can also check to see if the mobile endpoint device is on the private network based on an MFD identifier. If the mobile endpoint device is on the private network, a session may be created, and a session token may be issued that can be used as a security mechanism for the remainder of the session.

The URL address may also include additional webpages that allow a user to select a print job for execution in the MFD. The user may select the desired print job. The print job may be sent to the MFD, authenticated or verified by the print server, and the print job may be executed on the MFD.

In one embodiment, a user may be sent back to the web page to allow a user to select another print job or to disconnect from the print server. In one embodiment, the user may select a second print job. However, the second print job may not be a free print job. For example, the user may be allowed to perform black and white printing, but may want to print in color. The color print job request may be transmitted to the MFD, and the MFD may send an authorization request to the print server.

The print server may receive the second print job request from the MFD and may determine that the second print job request is excluded from the allowable or free print jobs. As a result, the print server may send an authentication failed message to prevent execution of the second print job request to the MFD. The print server may notify the mobile endpoint device that the second print job request has been denied by indicating that the second print job request requires payment. The print server may then transmit a payment page for the second print job request to the mobile endpoint device. The user may then enter the appropriate payment information for the second print job request. If payment information is received, the second print job request can be retransmitted to the MFD. The print server may confirm payment was received and may send an authorization confirmation to the MFD to execute the second print job request. At block 810, the method 800 ends.

Figure 9:
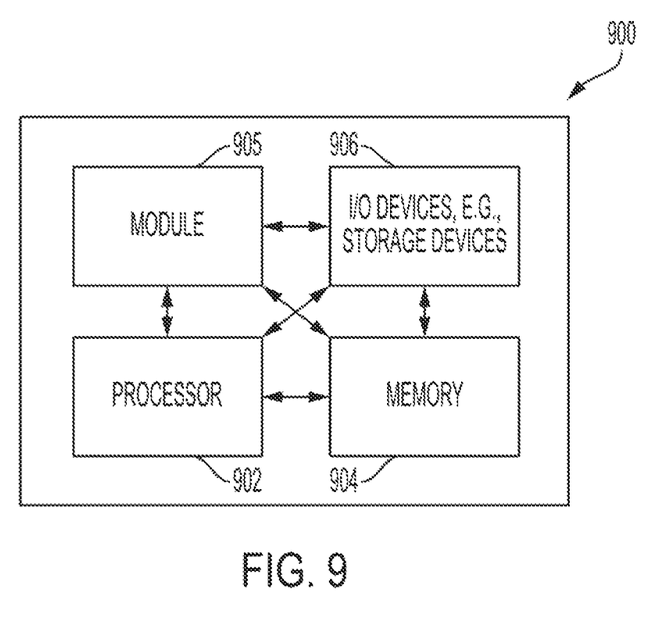
FIG. 9 illustrates a high-level block diagram of an example computer suitable for use in performing the functions described herein.

FIG. 9 depicts a high-level block diagram of a computer that is dedicated to perform the functions described herein. As depicted in FIG. 9, the computer 900 comprises one or more hardware processor elements 902 (e.g., a central processing unit (CPU), a microprocessor, or a multi-core processor), a memory 904, e.g., random access memory (RAM) and/or read only memory (ROM), a module 905 for authenticating a mobile print job on a public multi-function device, and various input/output devices 906 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 905 for authenticating a mobile print job on a public multi-function device (e.g., a software program comprising computer-executable instructions) can be loaded into memory 904 and executed by hardware processor element 902 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s)

can be perceived as a programmed processor or a specialized processor. As such, the present module 905 for authenticating a mobile print job on a public multi-function device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
    receiving, by a processor of a multi-function device (MFD) at a location of an enterprise, a print job request from a mobile endpoint device;
    transmitting, by the processor, an authentication request to a print server;
    receiving, by the processor, an authentication confirmation from the print server that a user of the mobile endpoint device is associated with the enterprise where the MFD is located at the location of the enterprise; and
    executing, by the processor, the print job request.

2. The method of claim 1, wherein the authentication confirmation indicates that the mobile endpoint device is connected to a private network of the enterprise at the location of the enterprise.

3. The method of claim 2, wherein the private network comprises a WiFi network that requires a user to log in with credentials provided by the enterprise.

4. The method of claim 1, wherein the authentication confirmation indicates that the user of the mobile endpoint device is authenticated as a loyalty member associated with the enterprise.

5. The method of claim 4, wherein different loyalty member tiers are associated with different allowable print jobs.

6. The method of claim 4, wherein different loyalty member tiers are associated with different pricing tiers for different types of print jobs.

7. The method of claim 1, further comprising:
    causing, by the processor, a machine readable code to be displayed on a graphical user interface of the MFD to initiate an authentication process for the print job request.

8. The method of claim 7, wherein the machine readable code includes a rolling security code, an MFD identifier, and a universal resource locator (URL) to the print server having a webpage that is to be displayed to the mobile endpoint device to initiate the authentication process.

9. The method of claim 8, further comprising:
    establishing, via the processor, a wireless connection to the mobile endpoint device in response to receiving the rolling security code from the mobile endpoint device.

* * * * *